March 15, 1955   F. E. SCHLEY ET AL   2,704,191
WIRE WINDING ATTACHMENT FOR MOTOR VEHICLES
Filed Aug. 16, 1948   3 Sheets-Sheet 1

INVENTORS
LYMAN A. SCHLEY
FREDERICK E. SCHLEY
BY
Wheeler, Wheeler & Wheeler
ATTORNEYS March 15, 1955 F. E. SCHLEY ET AL 2,704,191
WIRE WINDING ATTACHMENT FOR MOTOR VEHICLES
Filed Aug. 16, 1948 3 Sheets-Sheet 2

INVENTORS
LYMAN A. SCHLEY
FREDERICK E. SCHLEY
BY
Wheeler, Wheeler & Wheeler
ATTORNEYS March 15, 1955  F. E. SCHLEY ET AL  2,704,191
WIRE WINDING ATTACHMENT FOR MOTOR VEHICLES
Filed Aug. 16, 1948  3 Sheets-Sheet 3
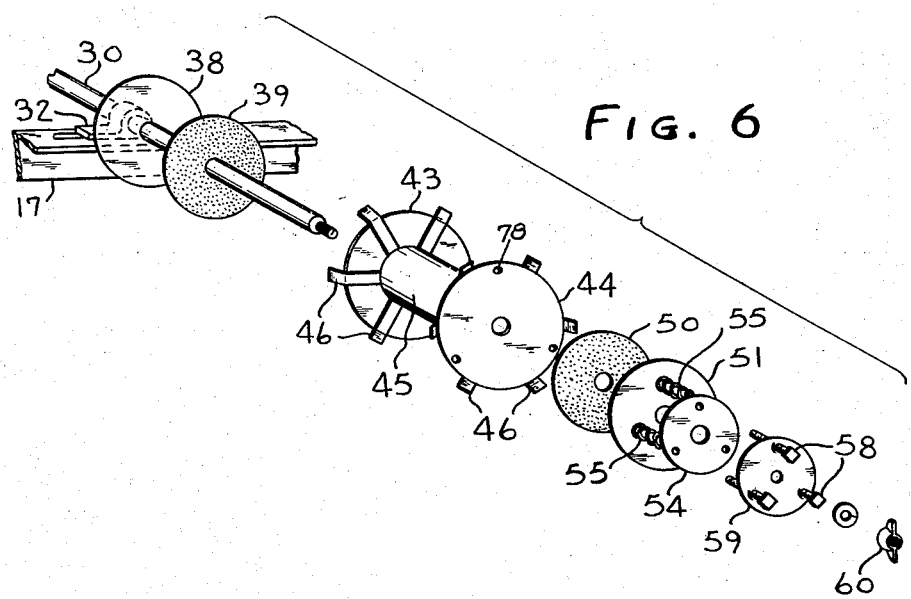
INVENTORS
LYMAN A. SCHLEY
FREDERICK E. SCHLEY
BY
Wheeler, Wheeler & Wheeler
ATTORNEYS

United States Patent Office 2,704,191
    Patented Mar. 15, 1955

2,704,191

WIRE WINDING ATTACHMENT FOR MOTOR VEHICLES

Frederick Emerson Schley and Lyman Adolph Schley, Burnett, Wis.

Application August 16, 1948, Serial No. 44,536

5 Claims. (Cl. 242—93)

This invention relates to improvements in devices for obtaining reduced speed power from a power take-off of an automotive vehicle and particularly to a device adapted for unrolling wire from and rerolling wire on a spool mounted on a vehicle and driven by the automotive engine of the vehicle.

Both plain and barbed wire are extensively used for fencing to keep livestock in a given area or out of cultivated fields, either permanently or temporarily. In either case, the wire must be unrolled about the desired fence line and, in the case of temporary fencing, must be re-rolled after the need for fencing has passed. In the prior devices utilized for the present purpose, it was necessary to provide complicated and expensive structures which required a considerable length of time for mounting on and dismounting from the vehicle and for connection of a drive between the vehicle or its motive means and the wire holding spool to synchronize the speed of rerolling with the ground travel speed of the vehicle. The changing of spools has also been a difficult and time-consuming operation. None of the prior devices have proven practical in spite of many attempts to provide a structure in which a spool is to be rotated, particularly, by the engine driving an automotive vehicle, such as the wheel type tractors with internal combustion engines, which are now common on farms.

It is, therefore, one object of the invention to provide means for obtaining slow speed power from a power take-off of an automotive vehicle and especially to provide means in which the power delivered is dependent on the load rather than on the engine speed.

Another object of the present invention is to provide a mechanism applicable to the usual wheel type tractor for unrolling wire from and rerolling wire on a spool driven by the tractor engine.

Another object of the invention is to provide a wire unrolling and rerolling device mounted on an automotive vehicle and driven by the engine thereof but at a speed independent of the rate of movement of the vehicle.

Another object of the invention is to provide a wire rerolling means for mounting on an internal combustion engine driven tractor with the engine providing power for automatically driving the spool at the speed required for maintaining proper tension on the wire and regardless of the speed of the vehicle.

A further object of the invention is to provide means for safely and quickly changing spools in a device for rolling and unrolling wire by use of a tractor.

And a further object of the invention is to provide a simple and cheap structure for unrolling and rerolling barbed wire by use of a tractor, the structure being such as to be easily and quickly mountable on and removable from the tractor by one person, being easily adjustable to secure a given tautness of wire and being rugged and easily maintained.

In the drawings:

Fig. 6 is an "exploded" perspective view of a portion of the structure.

Fig. 7 is a fragmentary sectional view of modified means for longitudinally applying pressure to the ends of the spool shown in Figs. 1–3.

Figures 1, 2:
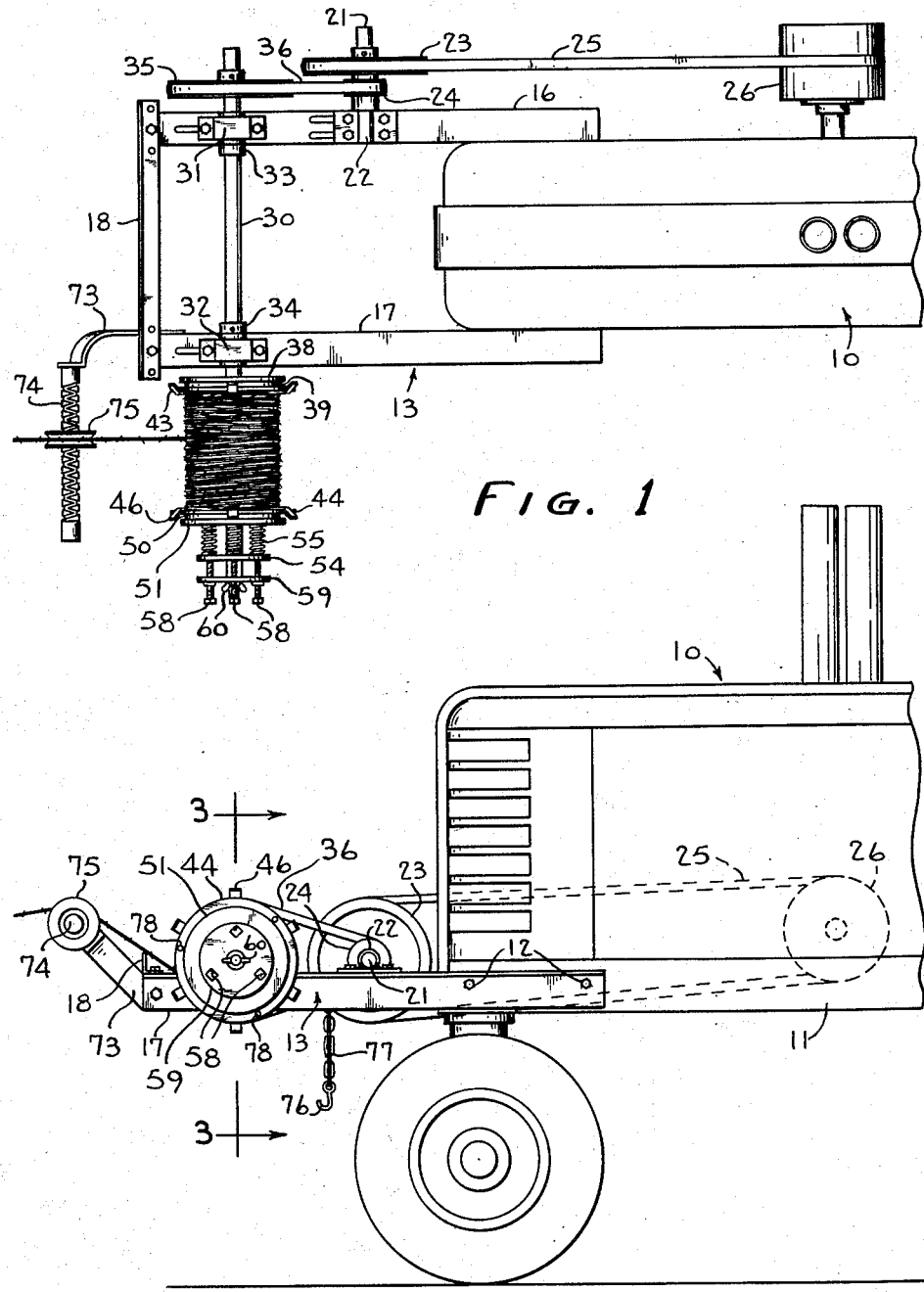
Fig. 1 is a top plan view of a device embodying the present invention, mounted on a wheel type tractor with a belt drive from the power take-off, only the front portion of the tractor being shown.
Fig. 2 is a side elevation of Fig. 1.

Generally, the present device includes a frame readily adaptable to wheel-type tractors for obtaining reduced speed power from the engine power take-off as in driving a drum for hoisting, etc. The device is particularly adapted for rotatably supporting a spool for unwinding and winding wire, and particularly barbed wire, from a spool. The spool mounting includes a shaft extending laterally from both sides of the mounting frame and connected by a speed reducing transmission with the belt pulley of the power take-off usually found on tractors designed for agricultural and general use.

The spool or drum is positioned and held on the shaft by a plurality of plate clutches. One of the plate clutches is limited in its movement on the shaft while the other clutch is movable as a whole axially of the shaft, both clutches being under the action of resilient means pressing the clutches severally against the ends of the spool so that slippage of the clutches is dependent on the load imposed thereon and, in handling wire, automatically keeps the wire taut regardless of the speed of tractor movement. The resilient pressing means is removable and replaceable as a unit and automatically distributes the pressure between the friction plates of the two clutches, such pressure being dependent on adjustment of the pressing means.

Referring particularly to the drawing, reference numeral 10 generally designates an automotive tractor having a gas engine drive and having a frame 11 with holes adjacent the forward end thereof for receiving bolts 12 by which a mounting frame generally designated 13, is secured on the tractor frame 11 to extend forwardly from the front end of the tractor. The mounting frame includes side members 16, 17, joined by a cross member 18, all of which are shown as angle shaped but which may be channels or other shapes. The cross-bar has a plurality of holes for adjustment to the width of the tractor frame. A shaft 21 is fixed in a bearing 22 which is adjustable longitudinally of the side frame member 16 and extends laterally from such side frame member for rotatably mounting thereon a pulley 23 of relatively large size and a pulley 24 of relatively small size, the pulleys preferably being of the V-groove type. Pulley 23 is connected by a belt 25 with the usual belt pulley 26 driven by the tractor engine.

A shaft 30 is rotatably mounted in bearings 31, 32 which are adjustable longitudinally of the side frame members 16, 17 toward and away from the forward end of the tractor. The shaft 30 extends beyond both sides of the mounting frame and is positioned against axial movement by collars 33, 34 bearing against the facing sides of the shaft bearings 31, 32. A pulley 35 is fixed on one of the extending ends of shaft 30 and is preferably of the V-groove type and of materially larger size than pulley 24, to which it is connected by a V-belt 36. Pulley 23, belt 25, pulleys 24, 35 and belt 36 accordingly provide a speed reducing means for transmitting power from the engine driven pulley 26 to the shaft 30.

Figure 3:
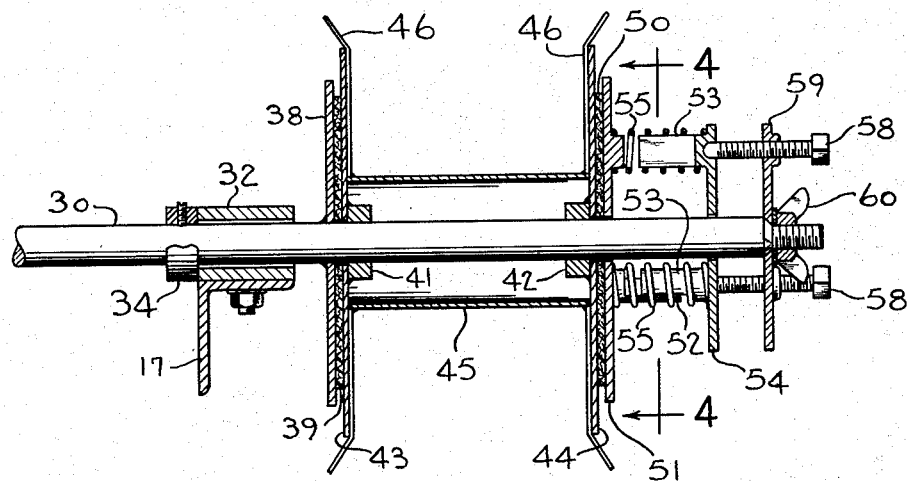
Fig. 3 is a vertical sectional view on the plane of line 3—3 of Fig. 2.
Figure 4:
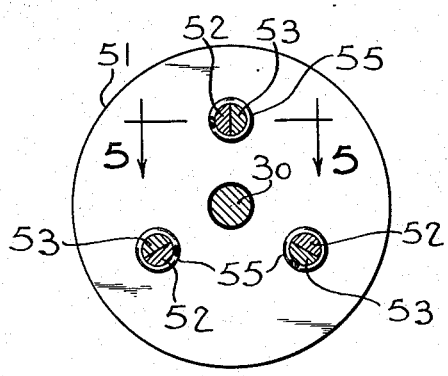
Fig. 4 is a vertical section on the line of 4—4 of Fig. 3.
Figure 5:
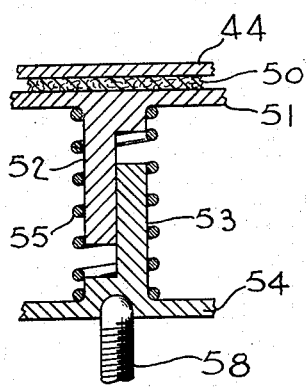
Fig. 5 is a partial sectional view on the plane 5—5 of Fig. 4.

A plate 38 is fixed on shaft 30 adjacent the side of frame side member 17 to serve as a fixed abutment for a spool holding structure to be described. A disc 39 of fibrous material is loosely mounted on shaft 30 and is substantially co-extensive with plate 38 and coacts with such plate in forming one of a plurality of friction clutch surfaces. Figs. 2 and 3, particularly, show a spool in place on shaft 30, the spool comprising blocks 41, 42 bearing on shaft 30, and plates 43, 44 fixed on the blocks and joined by a cylinder 45, and straps 46 fastened on the end plates and extending radially beyond the periphery of the end plates and bent to enlarge the capacity of the spool and to serve as guides during the rolling of wire on the spool.

Spool end 43 is pressed on fiber disk 39 by resilient means acting through a second friction clutch comprising a second fiber disk 50 and a plate 51 and pressed on spool end 44 by pressing means now to be described. In one embodiment of the present invention, the plate 51 has a plurality of studs 52 formed or fixed thereon to co-act with studs 53 formed or fixed on a plate 54 for retaining helical compression springs 55 about each pair of studs 52, 53. It will be seen that the studs are partially half-lapped and that the ends are spaced by the expansion of the springs 55 acting between the plates 51 and 54 to exert pressure on plate 51 dependent on the position of the plate 54 which is adjustable axially along shaft 30. Plate 54 is positioned by screws 58 threaded through a base plate 59 and having rounded ends bearing in sockets in plate 54 so that uniform distribution of the pressure of springs 55 over the entire area of plate 51 is obtainable, and may be varied in a simple manner by adjustment of screws 58. Base plate 59 is seated on a shoulder on and adjacent the end of shaft 30 and is held on such seat by a nut 60 threaded on the shaft.

The above structure accordingly provides two plates which are held at an adjustable axial spacing relative to each other and which, together with the co-acting studs and springs, provide means for pressing plates 51 and 38 against the friction disks 50 and 39 and pressing the disks against the ends 43, 44 of the spool. Hence, in combination with the spool ends, the resilient pressing structure provides two slip clutches having a plurality of pairs of friction surfaces which are self-adjustable to divide the pressure equally between the clutch surfaces. If the spool ends are so rough as to make direct contact thereof with the friction disks undesirable from the standpoint of wear, metal plates may be severally interposed between the spool ends and the friction disks without changing the manner of operation of the device other than adding to the sensitivity of the clutching actions.

Another embodiment of the pressure means is shown in Fig. 7 which is similar to that above described except that the screws 58 are replaced by hollow screws 64 having an internal groove 65 in a portion of the wall of the screw bores. Each pair of studs 52, 53 is now replaced by a guide tube 66 for springs 55, the tube extending through the screw bore and having a laterally extending pin 67 engageable in the screw bore groove 65. One end of tube 66 is flanged as at 68 to seat on plate 51 and the other end of the tube has a nut 69 threaded thereon for engagement with the ends of screws 64. A rod 70 extends through each guide tube and is threaded into plate 51, the other end of the rod having a head 71 thereon for engagement with the ends of its guide tube as a stop for limiting expansion of spring 55. The present pressing means functions precisely as above described but has the advantage that the pressing means may be removed from and replaced in its operative position on shaft 30 as a whole and without any material effort in re-compressing the springs, the springs being individually compressible and held as indicated in Fig. 7.

A bracket 73 is fixed to the forward end of the mounting frame 13 and extends forwardly and upwardly therefrom to support a double-threaded screw 74 on which is mounted a grooved sheave 75 over which the wire is run when such wire is being rewound, to secure level winding of the wire on the spool. Such level winding means is particularly desirable when rewinding barbed wire to minimize catching of the barbs on adjacent turns of the wire on the spool.

When it is desired to stretch the wire, hook 76 at one end of chain 77 attached to frame member 17, is hooked into one of holes 78 in spool end 44 to prevent all rotation of the spool while the tractor is slowly moved to give any desired degree of tension.

It will thus be seen that the present device provides a simple and easily maintained structure with a minimum number of rugged parts. The device is readily mountable on and dismountable from any wheel-type tractor merely by providing a pair of spaced holes in the tractor frame and by adjusting the mounting frame cross-bar to the width of the tractor frame. The speed-reducing transmission axle and the spool carrying shaft are adjustably attached to the mounting frame for proper tensioning of the belts in the power transmission between the tractor engine and the spool or drum. After the device is mounted and the belts are properly tensioned, to reroll wire, it is necessary only to mount an empty spool on the shaft and to fasten one end of the wire thereto. The tractor may then be driven along the line from which wire is to be picked up and at any speed desired and the wire is kept taut at all times, regardless of the tractor speed, by the action of the several multiple disk slip clutches. Adjustment of the clutch pressure means allows the slippage of the clutches to be regulated as desired without possibility of material error and such slippage also automatically regulates the speed of rotation of the spool as the circumference of the mass of wire on the spool changes. The pressure means is quickly removable and replaceable as whole and without change in the adjustment thereof.

When the present device is used for unrolling wire, the wire is passed through a guide at the rear end of the tractor and the tractor is driven along the line on which the wire is to be placed. The drive now acts as a brake and keeps the wire taut by the same action as above described.

When the device is to be used for purposes such as hoisting, the spool is replaced by a drum on which the cable or rope is wound and unwound, the action of the clutches being as previously described. If the drum is provided with a suitable surface, such drum may also be used as a pulley for the belt driving of any other machine.

We claim:

1. In a device for rolling and unrolling wire by use of an automotive vehicle, a frame attachable to the vehicle and extending therefrom, a shaft supported on and extending transversely of the frame and adapted to be driven by the vehicle engine, means for transmitting power from the vehicle engine to the shaft, a wire receiving spool rotatable on the shaft, clutch plates mounted on the shaft and coacting with the spool ends for forming a slip clutch, and means for resiliently pressing the spool and the clutch plates toward each other, the pressing means being removable as a unit and comprising a base plate removably fixed on the shaft, a presser plate adjustably spaced from the base plate, and from a clutch plate, a plurality of springs in arcuate series about said shaft and individually compressible and acting between the presser plate and the clutch plate, and guides mounted on the presser plate for the springs in their compression and expansion movements, the guides being without effect on the spacing between the presser plate and the clutch plate, said presser plate comprising a single disk common to all said springs.

2. In a device for rolling and unrolling wire by use of an automotive vehicle, a frame attachable to the vehicle and extending therefrom, a shaft supported on and extending transversely of the frame and adapted to be driven by the vehicle engine, means for transmitting power from the vehicle engine to the shaft, a wire receiving spool rotatable on the shaft, clutch plates mounted on the shaft and coacting with the spool ends for forming a slip clutch, and means for resiliently pressing the spool and the clutch plates toward each other, the pressing means being removable as a unit and comprising a base plate removably fixed on the shaft, a presser plate adjustably spaced from the base plate, and from a clutch plate, a plurality of springs individually compressible and acting between the presser plate and the clutch plate, guides for the springs in their compression and expansion movements, the guides being without effect on the spacing between the presser plate and the clutch plate, and individual screws for adjusting the spacing between the base plate and the presser plate for varying the degree of compression of the springs and for thereby controlling movement of the spool relative to the shaft.

3. In a device of the character described the subcombination which comprises a presser unit including in combination, a base plate, a presser plate, an annular series of adjustable couplings mounting said presser plate axially offset from the base plate, said presser plate comprising a single disk common to all said couplings and having an annular series of guide elements aligned with said couplings, a clutch plate having an annular series of guide elements, the guide elements on the presser plate being adapted for alignment with the guide elements on the clutch plate, and an annular series of helical springs mutually coiled about said aligned guide elements, the annular series of adjustable couplings comprising tubular members threaded to said base plate, the annular series of guide elements on said presser plate comprising tubular sleeves reciprocable through said tubular members, said annular series of guide elements on the clutch plate comprising bolts reciprocable through said tubular sleeves and threaded to said clutch plate, said helical springs being mutually coiled about said bolts and sleeves, said tubular sleeves having retractible key-way connections with said tubular members whereby said springs may be compressed against their self-bias to lock said sleeves in retracted position.

4. In a device of the character described the subcombination which comprises a base plate, said base plate having an annular series of tapped openings, and a series of tubular members in threaded engagement with said tapped openings, tubular sleeves reciprocable in said tubular members, and a presser plate mounted at corresponding ends of said tubular members and in spaced relation to said base plate, said tubular sleeves constituting guide members having corresponding shouldered end portions, helical springs between said shouldered end portions of the sleeves and said presser plates whereby to place said end portions under the tension of the springs, and a clutch disc spaced from said presser plate, bolts reciprocable through said tubular sleeve guide members and threaded to said clutch disc for its support, said tubular guide members having retractible key-way connections with said tubular members whereby said springs may be compressed against their self-bias and locked in retracted position.

5. In a wire-reeling tractor attachment, the combination with a power-driven shaft with a shouldered end and having a clutch plate fixed thereto in spaced relation to the shaft end, a wire spool replaceably mounted on the shaft between the clutch plate and the shaft end and having spaced heads, one of which is in frictionally driven engagement with the clutch plate, and a presser assembly holding the spool yieldably to the clutch plate and having a quickly detachable connection to the shaft comprising a nut threaded to the end of the shaft beyond the shoulder and constituting the sole means required for the release of the spool, said assembly comprising a second plate bearing against the second head of the spool, spring means biasing the second plate toward the first plate and against the intervening spool, a spring seat member on said shaft and engaged by the spring means, and a third plate seated against the shoulder and confined by the nut and having screw means threaded to the third plate and engaging the spring seat member and constituting means for adjusting spring bias, the spring seat member being axially adjustable along the shaft on the thrust of said screw means and the whole assembly being freely removable on release of said connection, whereby to expose the spool for replacement.

References Cited in the file of this patent
UNITED STATES PATENTS

| | | |
|---|---|---|
| 261,658 | Bolin | July 25, 1882 |
| 577,290 | Evans | Feb. 16, 1897 |
| 670,967 | Powers | Apr. 2, 1901 |
| 932,420 | Cosey | Aug. 24, 1909 |
| 1,043,111 | King et al. | Nov. 5, 1912 |
| 1,337,142 | Lemke et al. | Apr. 13, 1920 |
| 1,358,049 | Atwood | Nov. 9, 1920 |
| 1,563,874 | Schmidt et al. | Dec. 1, 1925 |
| 1,576,054 | Larson | Mar. 9, 1926 |
| 1,730,331 | Pflueger et al. | Oct. 1, 1929 |
| 1,930,159 | Crilly | Oct. 10, 1933 |
| 1,976,314 | White | Oct. 9, 1934 |
| 2,028,700 | Guier | Jan. 21, 1936 |
| 2,171,034 | Kriegbaum et al. | Aug. 29, 1939 |
| 2,231,145 | Watanabe | Feb. 11, 1941 |
| 2,324,350 | Baal | July 13, 1943 |
| 2,391,240 | Houston | Dec. 18, 1945 |
| 2,473,959 | Kriegbaum et al. | June 21, 1949 |
| 2,501,390 | Jeffreys | Mar. 21, 1950 |
| 2,507,272 | Rosendahl | May 9, 1950 |
| 2,540,997 | Schmitter | Feb. 6, 1951 |